April 26, 1927.

J. W. BISHOP

MACHINE FOR SETTING TENPINS

Filed March 18, 1925  7 Sheets-Sheet 1

Inventor:
Joseph W. Bishop
By: Wm O. Bell
Atty.

April 26, 1927.

J. W. BISHOP

1,626,446

MACHINE FOR SETTING TENPINS

Filed March 18, 1925     7 Sheets-Sheet 4

Inventor:
Joseph W. Bishop
By Wm. O. Bell
Atty.

April 26, 1927.

J. W. BISHOP

1,626,446

MACHINE FOR SETTING TENPINS

Filed March 18, 1925 7 Sheets-Sheet 6

Inventor:
Joseph W. Bishop
By: Wm. O. Bell
Atty.

April 26, 1927.

J. W. BISHOP 1,626,446

MACHINE FOR SETTING TENPINS

Filed March 18, 1925    7 Sheets-Sheet 7

Inventor:
Joseph W. Bishop
By: Wm O Bell
atty.

Patented Apr. 26, 1927.

1,626,446

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

MACHINE FOR SETTING TENPINS.

Application filed March 18, 1925. Serial No. 16,332.

This invention relates to pin setters for bowling alleys, and its object is to reduce the work and lessen the labor of the pinboy by providing a machine which is filled with pins while in an elevated position and is then caused to operate by manual manipulation of a valve to lower and set the pins upon the alley bed and then rise to filling position.

Other objects of the invention are to simplify the operation of filling the machine in an elevated position with tenpins and to prevent the pins from accidentally becoming dislodged or slipping through the machine before it has been brought to setting relation to the alley bed; to support the pins in an inclined position in the pockets of the machine while the latter is moving to the lowest position of the main frame, and then uprighting the pins so that they will fall gently and with comparatively little noise into position upon the spots on the alley bed; to insure a smooth, even and semi-automatic operation of the machine; and to provide for accurate spotting of the pins.

The invention has other objects in view which will appear hereinafter in the detail description of the embodiment of the invention which has been selected for illustration in the accompanying drawings, referring to which

Figure 2:
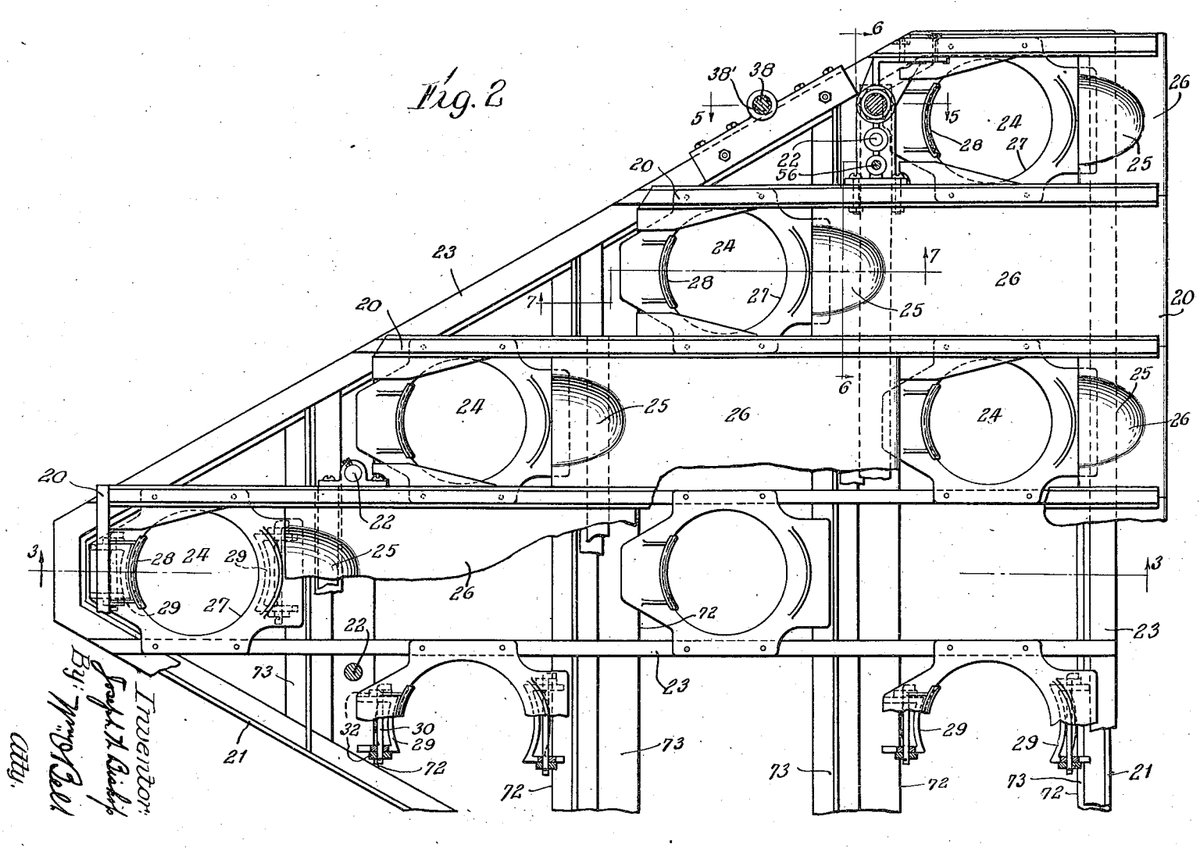
Fig. 2 is a horizontal sectional view on the line 2—2 of Fig. 3 showing the machine in top plan.
Figures 3, 4:
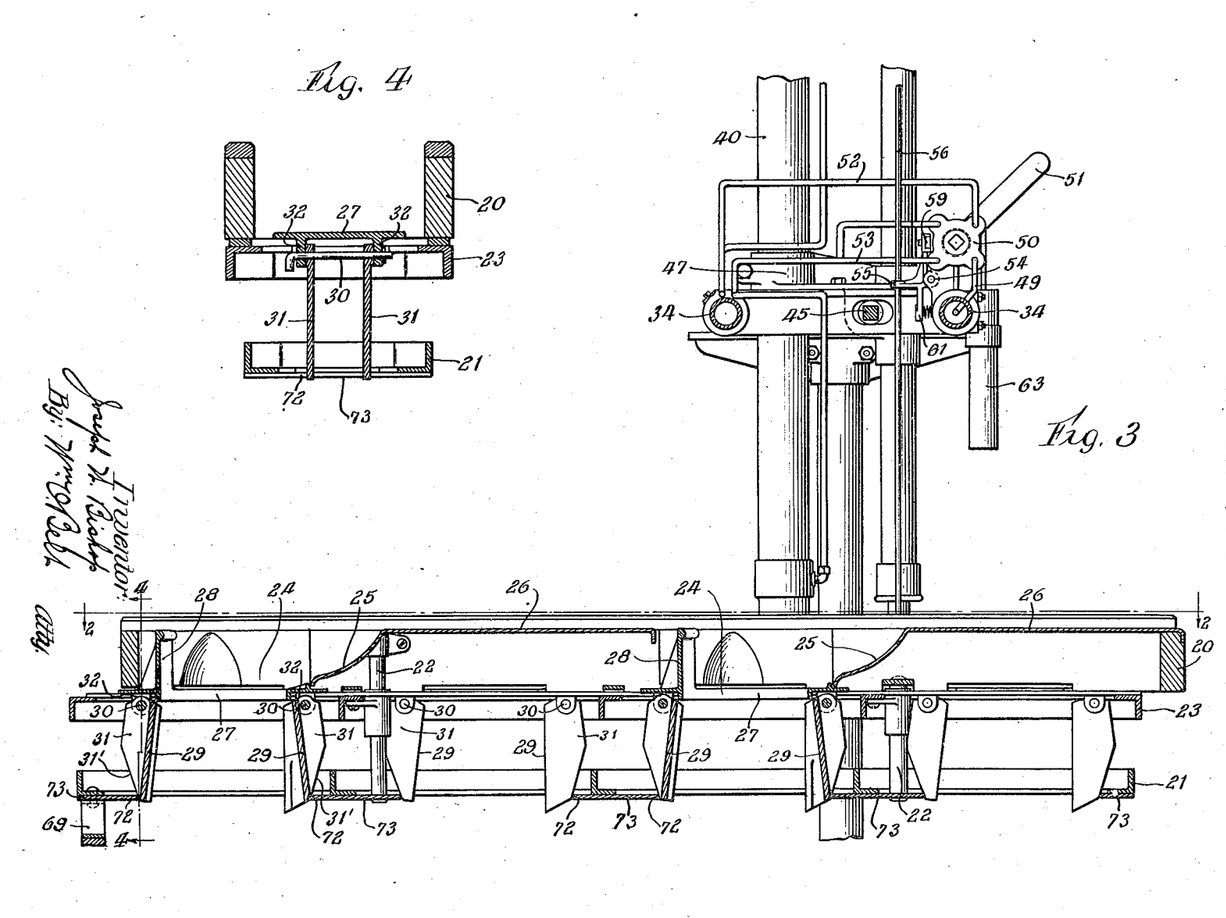
Fig. 3 is a vertical sectional view on the line 3—3 of Fig. 2.
Fig. 4 is a detail sectional view on the line 4—4 of Fig. 3.
Figures 7, 8, 9:
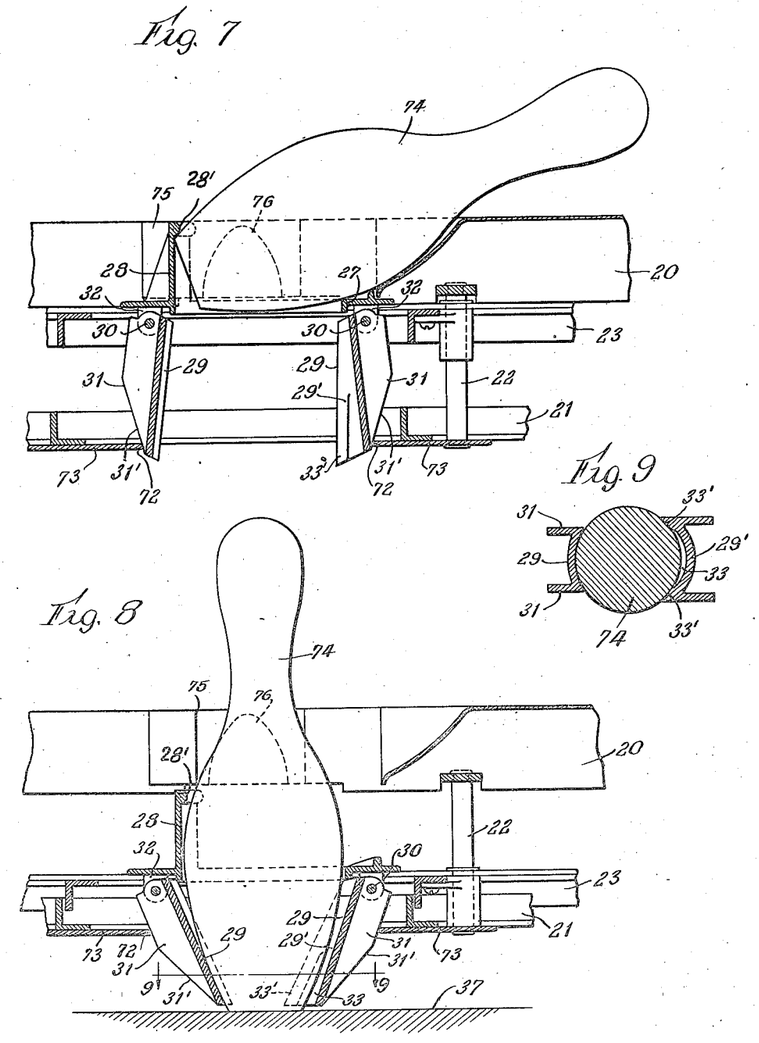
Fig. 7 is a sectional view on the line 7—7 of Fig. 2 showing the pin supported in the machine in elevated position.
Fig. 8 is a similar view showing the pin in set position on the alley bed.
Fig. 9 is a detail sectional view on the line 9—9 of Fig. 8.

Referring to the drawings, the invention comprises a main receiving frame having an upper deck 20 and a lower deck 21 spaced apart but rigidly secured together by rods 22 (Fig. 3). A setting frame 23 is arranged between the decks of the main frame and is movable conjointly with and relatively to the main frame, being guided in its relative movement on the rods 22. The machine is provided with ten pockets 24 to receive the tenpins, and each of these pockets is a duplicate of the others and is formed partly in the upper deck of the main frame and partly in the intermediate frame. These frames are preferably made of metal, or part wood and part metal, in skeleton form, and the upper deck of the main frame has, for each pocket, a dished portion 25 (Figs. 2 and 3) to receive the body of the pin and the deck section 26 back of said dished portion, over which or on which the pin may be thrown or slid into inclined position in the pocket 24 and resting in the dished portion 25. The intermediate setting frame comprises a plurality of rings 27, each of which has an upstanding stop 28 at the front of the pocket and provided with a rib 28', Figs. 7, 8, and this stop projects up through the upper deck of the main frame to a position substantially at or about level with the deck section 26. Two or more positioning shoes 29 are pivotally hung from beneath each of the rings 27, and if two of these shoes are used, they will be disposed diametrically opposite each other, as shown in Figs. 2 and 3. Each shoe is conveniently pivoted by a pin 30 (Fig. 4) which passes through flanges 31 on the shoe and lugs 32 on the ring 27. This pin can be easily removed to repair or replace a shoe at any time. To insure correct spotting of the pins, I prefer to provide a three-point contact of the shoes with the pin, and this is accomplished with two shoes by making one, as 29′ (Fig. 9) somewhat wider than the other shoe and recessing it at 33 between its side edges so that it will furnish a two-point contact at 33′, 33′ with the pin.

Figure 1:
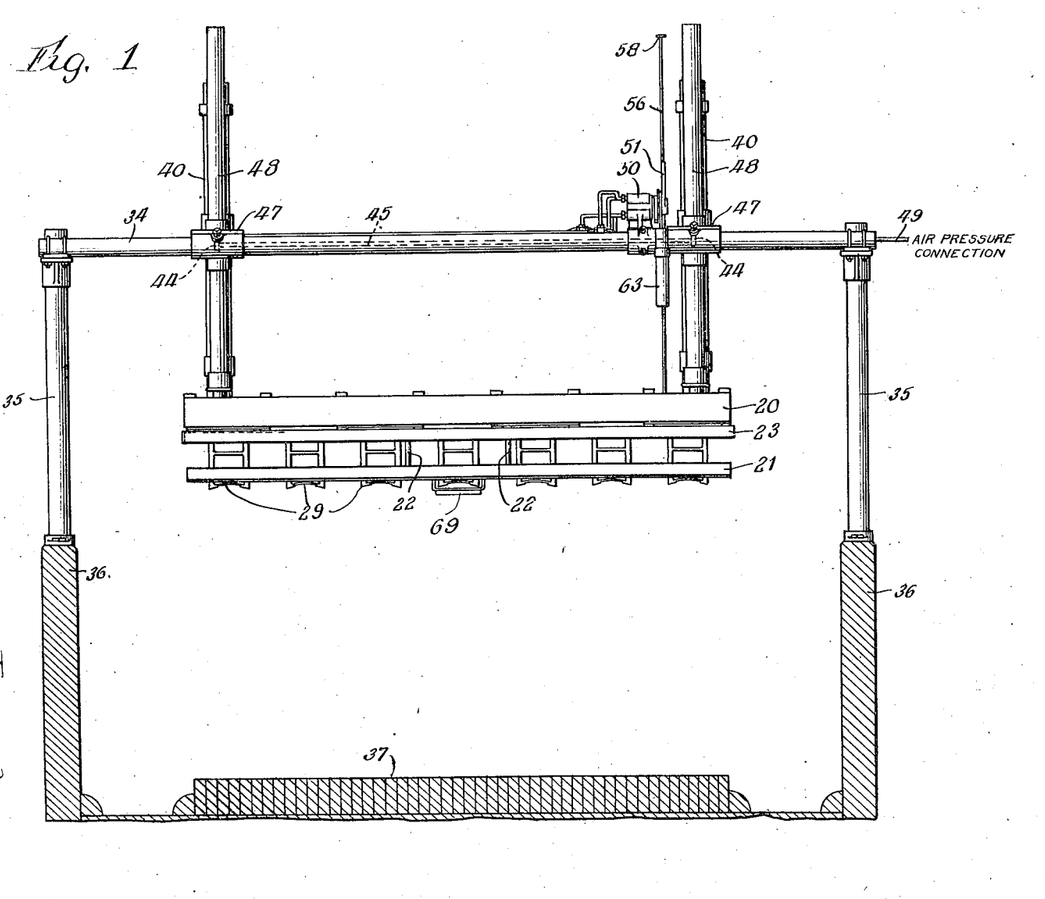
Fig. 1 is a sectional elevation through the alley bed and kick-backs and showing the machine in elevated position.

The frames above described are supported from a crossbar 34 on uprights 35 which are mounted on the kick-backs 36 at the sides of the alley bed 37, at the pit end of the alley (Fig. 1). Piston rods 38 carrying pistons 39 operating in the cylinders 40 are connected at 38′ with the intermediate frame (Fig. 5) and through the movement of these pistons and piston rods the main frame, as well as the intermediate frame, which are engaged to move conjointly, as previously described, are raised and lowered. Guide rods 41 are engaged with the upper deck of the main frame at 42 and they are provided with racks 43 to engage pinions 44 on a transverse shaft 45. This shaft is supported at 46 in brackets 47 which are mounted on the cross-bar 34 and also support the tubes 48 in which the guides 41 operate. The purpose of these racks and pinions is to insure an even movement of the machine in its lowering and raising travel, and to prevent tilting and binding and to relieve the pistons of strain.

Figures 5, 6:
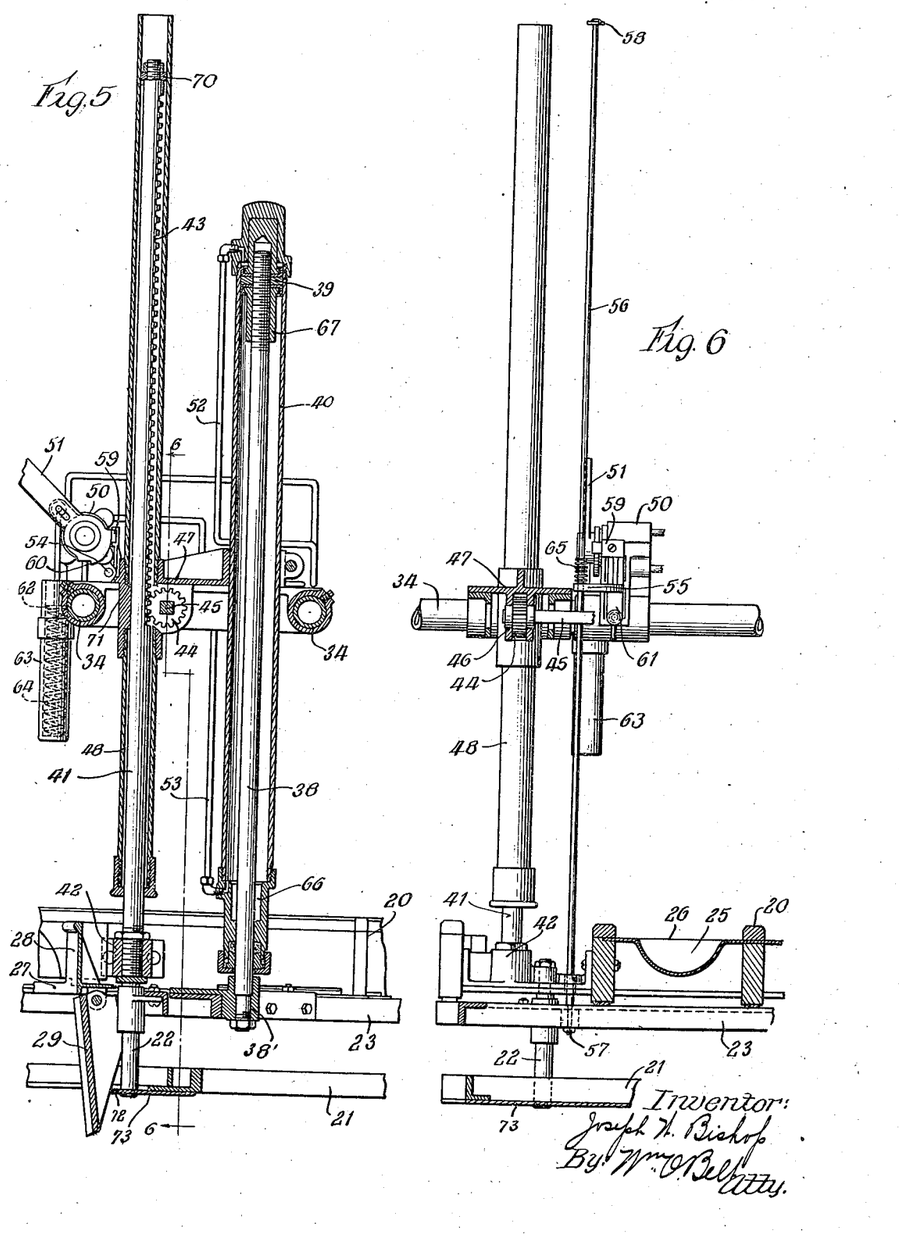
Fig. 5 is a vertical sectional view on the line 5—5 of Fig. 2.
Fig. 6 is a sectional view on the line 6—6 of Fig. 5 and also the line 6—6 of Fig. 2.

I contemplate operating the machine pneumatically, and for this purpose I provide a pipe 49 leading from an air pressure supply. The cross-bar 34, as well as the uprights 35, may be made of tubing, and the air pressure connection 49 may be arranged in the pipe 34. A two-way valve 50 (Fig. 3) is mounted on the cross-bar 34 and is provided with an operating handle 51 conveniently located preferably at one side of the machine for operation by the pinboy. The air pressure connection 49 leads to the valve and a connection 52 leads from the valve to the top of each cylinder 40 and a connection 53 leads to the bottom of each cylinder 40, so that when the valve lever is in up position as shown in Figs. 3 and 5, the connection to the bottom of the cylinders will be open to admit pressure beneath the pistons to raise and hold the frames in elevated position, and when the valve lever is thrown down to its lowest position (not shown) the connections to the top of the cylinders will be opened to admit pressure above the pistons to lower the frames to set the pins on the alley bed.

To make this lowering and raising movement of the frames automatic, I provide a three-arm lever which is pivoted at 54 to the valve casing. One arm 55 of the lever has an enlarged opening or a slot to receive a trip rod 56 which is secured at its lower end to the intermediate frame at 57 and carries a button 58 at its upper end. Another arm 59 is arranged to engage a shoulder 60 (Fig. 5) on the valve lever, and the other arm 61 (Fig. 3) is spring-pressed to hold the arm 59 in operative relation to the valve lever and shoulder. When the valve lever has been swung to its lowest position a plunger 62 (Fig. 5) operating in a cylinder 63 will compress the spring 64 and when the button 58 engages a spring 65 above the arm 55 and swings the three-arm lever on its pivot 54, the arm 59 will be disengaged from the shoulder 60 and the spring 64 will then return the valve and the valve lever to normal position. The reversal of movement of the pistons will be timed to occur at or immediately after the moment when the pins have been uprighted and set in spotted position on the alley bed, and in order to relieve the machine from shock or jar, as well as to eliminate noise, I have provided a contracted chamber 66 at the bottom of each cylinder 40 to receive a contracted portion 67 of the piston, forming a dashpot or air cushion.

Figures 10, 12:
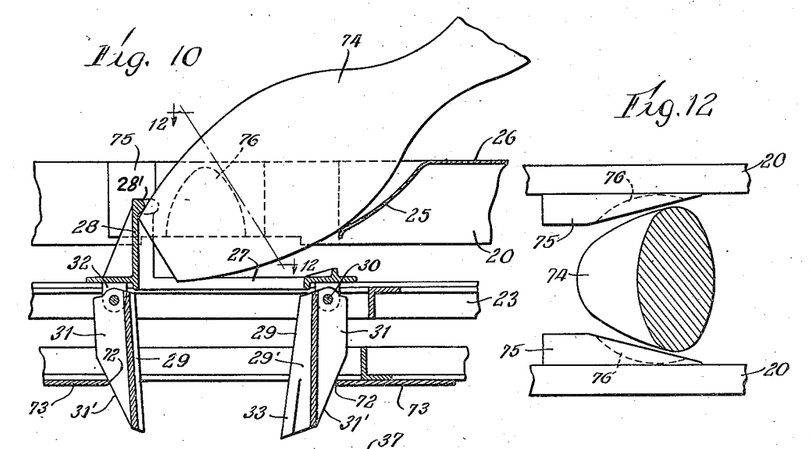
Figs. 10 and 11 show successive positions of the pin in a pocket of the machine between the positions illustrated in Figs. 7 and 8.
Fig. 12 is a sectional view on the line 12—12 of Fig. 10.

It will be observed from the foregoing description that the pinboy is only required to fill the upper deck of the main receiving frame with pins when the frames are in elevated position, and then operate the lever when it is desired to set the pins on the alley bed. A single operation of the lever starts the frames in their lowering movement and this movement continues until the pins have been set on the spots of the alley bed, whereupon the frames automatically reverse their movement and rise to elevated position. Thus the machine is semi-automatic in operation, requiring only the throw of the valve lever to lowering position to accomplish a complete cycle of movement of the frames. When the frames are loaded with a full set of pins, which will be the usual condition, there will be a tendency of the machine to swing downward at the front. I provide a foot 69 at the front of the lower deck of the main frame (Fig. 3) to support the front end of the frames on the alley bed. The guide rods 41 are provided at their upper ends with stops 70 (Fig. 5) to engage shoulders 71 on the brackets 47 to limit the downward movement of the main frame, and the foot 69 is intended to steady the front end of the machine in position when the main frame has reached the limit of its lowering movement. After the main frame has come to rest the intermediate frame which is engaged with the piston rods 38 continues its downward movement, while the portions 67 of the pistons are entering the air cushion chambers 66 and thus the intermediate frame travels from elevated position to lowered position of the main frame conjointly therewith and then continue to travel independently of the main frame from the position of Fig. 7 to the position of Fig. 8. During the travel of the main frame to lowered position, the pin remains in the inclined position shown in Fig. 7, but when the main frame comes to rest in lowered position and the intermediate frame continues lowering, the pin is swung to upright position as shown successively in Figs. 10, 11, 8, until it is deposited on the spot on the alley bed. When the pin is placed in a pocket its base will be engaged beneath the rib 28′, Figs. 7, 10, which retains the pin in inclined position while the machine is at rest and starts the pin in its uprighting movement when the receiving frame comes to rest in its lowered position, and the setting frame carrying the stop 28 continues its downward movement relative to the receiving frame. In this initial uprighting movement the pin fulcrums on the lower edge of the dished portion 25, Fig. 10. The flanges 31 at the back of the shoes 29 are beveled at 31′ and these beveled edges engage the edge 72 of the cross plates 73 of the lower deck 21, when the intermediate frame 23 continues to lower after the main frame has come to rest, and this moves the lower ends of the shoes inward, as indicated in Fig. 10, until they are brought to setting position (Figs. 11, 8) to receive the pin 74, which at that time is being moved to upright position. Thus the shoes are properly positioned to position the pin on the alley spot when the pin is uprighted, and the setter can be constructed and made to operate with such accuracy that the pins will be properly spotted at every complete cycle of operation. The lowering movement of the frames is limited so that the shoes will clear the alley bed when in lowermost position. The shoes are swung to closed position by contact with parts of the main frame and not by contact with the alley bed, thereby avoiding damage to the alley bed, which may result from repeated engagement of the shoes therewith.

Figure 11:
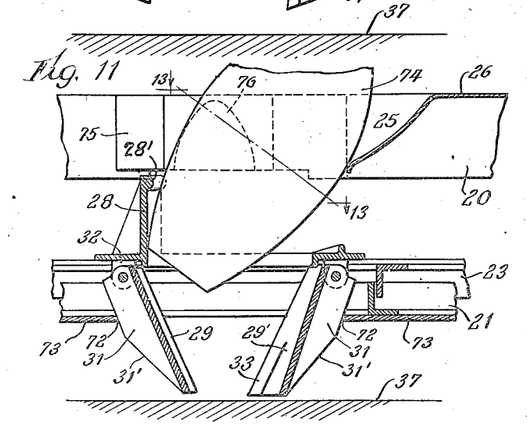
Figure 13:
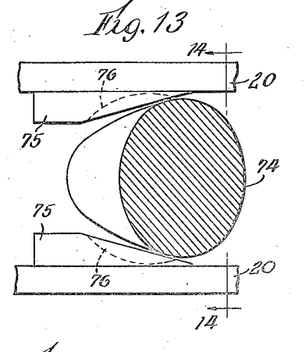
Fig. 13 is a sectional view on the line 13—13 of Fig. 11.
Figures 14, 15:
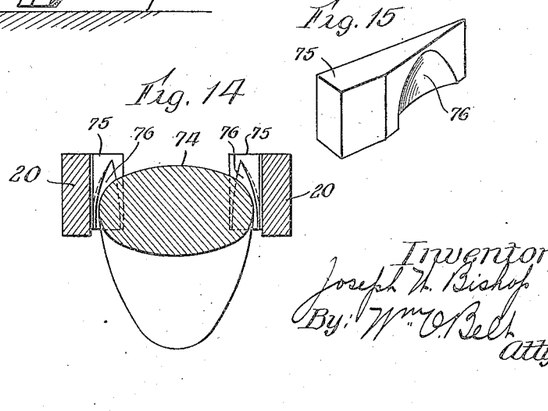
Fig. 14 is a sectional view on the line 14—14 of Fig. 13.
Fig. 15 is a detail perspective view of one of the wedge blocks.
Figure 19:
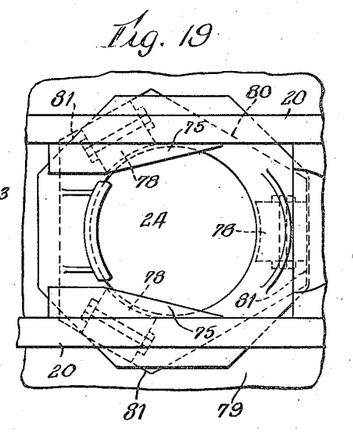
Fig. 19 is a plan view showing a pocket comprising three shoes in another position.

To prevent the pins from falling through the pockets before they are properly uprighted for setting, I provide wedge blocks 75 which are secured on the upper deck 20 of the main frame on opposite sides of each pocket 24 (Figs. 10, 19). These wedge blocks are recessed at 76 (Figs. 10, 12) to receive the body of the pin, and the blocks are so shaped that when the pin is thrown into inclined position upon the setter, the latter being at rest in elevated position (Fig. 7), they will engage the body of the pin and prevent it from passing down through the pocket, and this condition will continue until the main frame comes to rest in lowered position and the intermediate frame has moved sufficiently to insure proper positioning of the shoes by the time the pin is released to drop through the pocket upon the alley bed (Figs. 10, 11). The release of the pin is effected by the lowering of the intermediate frame from the upper deck of the main frame. The stop 28 is carried down by the intermediate frame, as shown in Figs. 10 and 11, when the intermediate frame lowers relative to the upper deck of the main frame and the base of the pin is carried with the stop, gradually moving the pin towards upright position, and by reason of this lowering of the intermediate frame and partial uprighting of the pin, the pin is enabled to pass between the wedge blocks as it is uprighted to setting and spotting position.

Figure 16:
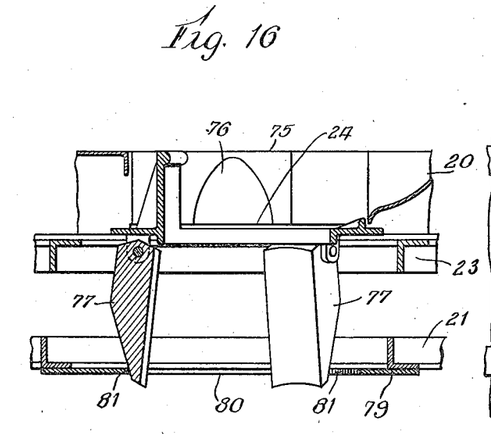
Fig. 16 is a sectional elevation.
Figure 17:
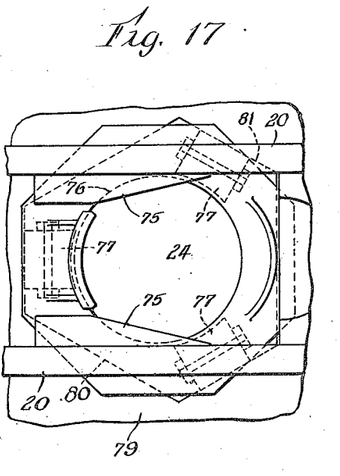
Fig. 17 is a plan view showing a pocket comprising three shoes arranged in one position.
Figure 18:
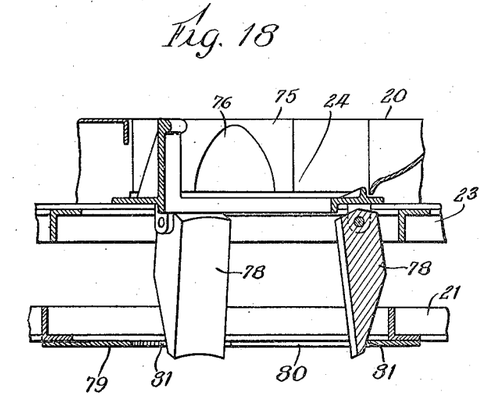
Fig. 18 is a sectional elevation.

I have found it satisfactory to employ two oppositely disposed position shoes, as shown in Figs. 1–11, but I may also employ three shoes, 77, disposed as shown in Figs. 16 and 17 or three shoes, 78, disposed as shown in Figs. 18 and 19, and I may make the shoes 77, 78 of solid material, as wood, as there shown, or I may make them of skeleton form, as shown in Figs. 7–11. These shoes constructed and positioned in any suitable manner are adapted to swing to open position by gravity when the intermediate frame moves upward to its normal position adjacent the upper deck of the main frame (Figs. 3, 7), and are adapted to be positively moved to closed position by relative movement of the intermediate frame and the lower deck of the main frame and engagement of the back of each shoe with the lower deck of the main frame, and without the shoes in any way engaging the alley bed.

The lower deck 21 of the main frame is constructed in skeleton form with cross plates 73, as shown in Figs. 2 and 3, which provide the edges 72 to move the shoes inwardly; but when three shoes are used I may provide a bottom plate 79 on the lower deck having openings 80 shaped to provide straight edges 81 for engagement with the shoes, as shown in Figs. 16–19, or these edges may be provided by the addition of plates and strips to the skeleton face shown in Figs. 2 and 3.

I am aware that changes in the form, construction, arrangement and operation of parts may be made without departing from the invention or sacrificing any of the advantages thereof, and I reserve the right to make all such changes as fairly fall within the scope of the following claims:

I claim:

1. A bowling alley pin setter comprising a vertically movable receiving frame having an upper and a lower deck spaced apart, and a setting frame intermediate of said decks and movable vertically conjointly with and independently of said receiving frame.

2. A bowling alley pin setter comprising a vertically movable receiving frame having an upper and a lower deck spaced apart, a frame intermediate of said decks and movable vertically conjointly with and independently of said receiving frame, and means carried by the intermediate frame for positioning the pins on the alley bed.

3. A bowling alley pin setter comprising a vertically movable receiving frame having an upper and a lower deck spaced apart, a frame intermediate of said decks and movable vertically conjointly with and independently of said receiving frame, and means carried by the intermediate frame and actuated by the receiving frame for positioning the pins on the alley bed.

4. A bowling alley pin setter comprising a vertically movable receiving frame, a setting frame movable vertically conjointly with and independently of the receiving frame, and means carried by the setting frame and actuated by the receiving frame for positioning the pins on the alley bed.

5. A bowling alley pin setter comprising a vertically movable receiving frame having pocket openings therein, a setting frame movable vertically conjointly with and independently of said receiving frame, and means carried by the setting frame and operating in said openings in the receiving frame for positioning the pins on the alley bed.

6. A bowling alley pin setter comprising a vertically movable receiving frame having pocket openings therein, a setting frame movable vertically and conjointly with and independently of said receiving frame, and means carried by the setting frame and engaging the edge of the openings in the receiving frame to be operated by the receiving frame in said openings for positioning the pins on the alley bed.

7. A bowling alley pin setter comprising a vertically movable receiving frame having pocket openings therein, a setting frame movable vertically conjointly with and independently of said receiving frame, and movable shoes carried by the setting frame and actuated in said pockets by engagement with the receiving frame to position the pins on the alley bed.

8. A bowling alley pin setter comprising a vertically movable receiving frame, having an upper and a lower deck spaced apart, and pocket openings in the lower deck, a frame intermediate of said decks and movable vertically conjointly with and independently of said receiving frame, and means carried by the intermediate frame and operated by the main frame in the openings in the lower deck of the main frame for positioning the pins on the alley bed.

9. A bowling alley pin setter comprising a vertically movable receiving frame having an upper and a lower deck spaced apart, and pocket openings in the lower deck, a frame intermediate of said decks and movable vertically conjointly with and independently of said receiving frame, and means carried by the intermediate frame and projecting into the openings in the lower deck of the receiving frame and engaging the edge of said openings so that said means will be moved inwardly when the intermediate frame moves towards the lower deck of the main frame to position the pins on the alley bed.

10. A bowling alley pin setter comprising a vertically movable receiving frame having an upper and a lower deck spaced apart, and pocket openings in the lower deck, a frame intermediate of said decks and movable vertically conjointly with and independently of said receiving frame, and setting means comprising shoes pivoted to the intermediate frame and arranged to operate in the openings in the lower deck of the receiving frame for positioning the pins on the alley bed.

11. A bowling alley pin setter comprising a vertically movable receiving frame having an upper and a lower deck spaced apart, and pocket openings in the lower deck, a frame intermediate of said decks and movable vertically conjointly with and independently of said receiving frame, and shoes pivoted to the intermediate frame and suspended in the openings in the lower deck of the receiving frame, the backs of said shoes engaging the edge of said openings so that the shoes will be moved inwardly when the intermediate frame approaches the lower deck of the receiving frame to position the shoes on the alley bed.

12. A bowling alley pin setter comprising a frame, and a plurality of shoes for each pin carried by said frame for positioning the pins on the alley bed, the plurality of shoes have conjointly but three points of contact with each pin.

13. A bowling alley pin setter comprising a frame, and a pair of shoes for each pin carried by the frame for positioning the shoes on the alley bed, one shoe having but two point contact at its side edges with the pin and the other shoe having but one point contact with the pin.

14. A bowling alley pin setter comprising a frame, and a pair of shoes for each pin carried by the frame for positioning the shoes on the alley bed, one shoe of each pair having its side edges arranged to engage the pin between its side edges to make but one point contact with the pin.

15. A bowling alley pin setter comprising a vertically movable receiving frame having an upper and a lower deck spaced apart, a setting frame between said decks and movable vertically conjointly with and independently of said receiving frame, there being pockets in the upper deck and setting frame to receive the pins and openings in the lower deck registering with said pockets, and a plurality of shoes movably mounted on the setting frame at the pockets and operating through the openings in the lower deck under the pockets for positioning the pins on the alley bed, the pins resting in inclined position upon the receiving frame and in the pockets, means on the setting frame engaging the pins in said inclined position, the movement of the setting frame relative to the receiving frame causing the shoes to be operated by engagement with the lower deck of the receiving frame to move inwardly for receiving the pins when they are uprighted by reason of the relative movement of said frames and for positioning the pins on the alley bed.

16. A bowling alley pin setter comprising a vertically movable receiving frame having an upper and a lower deck spaced apart, and pocket openings in the lower deck, a frame intermediate of said decks and movable vertically conjointly with and independently of said receiving frame, and a plurality of shoes for each pin pivotally suspended from the intermediate frame and having contact with the pin for positioning the pin on the alley bed, said shoes being arranged to operate in the openings in the lower deck of the receiving frame against the edge of said openings so that they will be moved inwardly when the intermediate frame approaches the lower deck of the receiving frame and will swing outwardly by gravity when the intermediate frame moves away from the lower deck of the receiving frame.

17. A bowling alley pin setter comprising a frame having pockets therein to receive the pins, and means on the frame at each pocket to prevent the pins from accidentally passing through the pockets.

18. A bowling alley pin setter comprising a vertically movable receiving frame, a setting frame movable vertically conjointly with and independently of said receiving frame, said frames having pocket openings therein to receive the pins, and wedge blocks on the receiving frame to prevent the pins from accidentally passing through said pocket openings.

19. A bowling alley pin setter comprising a vertically movable receiving frame, a setting frame movable vertically conjointly with and independently of said receiving frame, said frames having pocket openings therein to receive the pins, and recessed wedge blocks on the receiving frame to prevent the pins from accidentally passing through said pocket openings.

20. A bowling alley pin setter comprising a vertically movable receiving frame, a setting frame movable vertically conjointly with and independently of said receiving frame, said frames having pocket openings therein to receive the pins and a stop for each pocket, a portion of the receiving frame and the stop on the setting frame forming a support for each pin, and means on the receiving frame to prevent the pins from accidentally passing through said pocket openings.

21. A bowling alley pin setter comprising a vertically movable receiving frame, a setting frame movable vertically conjointly with and independently of said receiving frame, said frames having pocket openings therein to receive the pins and a stop for each pocket, a portion of the receiving frame and the oppositely disposed stop on the setting frame forming a support for each pin, and oppositely disposed blocks on the receiving frame to prevent the pins from accidentally passing through said pocket openings.

22. A bowling alley pin setter comprising a vertically movable receiving frame, a setting frame movable vertically conjointly with and independently of said receiving frame, said frames having pocket openings therein to receive the pins and a stop for each pocket, a portion of the receiving frame at the back of each pocket and the stop on the setting frame at the front of each pocket constituting a support for the pin in inclined position in said pocket, said pin being moved to upright position in the pocket by relative movement of said frames, and means at the sides of the pockets to prevent the pins from accidentally passing through said pocket openings.

23. A bowling alley pin setter comprising a vertically movable receiving frame, a setting frame movable vertically conjointly with and independently of said receiving frame, and pneumatic means for operating said frames.

24. A bowling alley pin setter comprising a vertically movable receiving frame, a setting frame carrying the receiving frame and movable vertically conjointly with and independently of said receiving frame, and pneumatic means for operating said frames.

25. A bowling alley pin setter comprising a vertically movable receiving frame, a setting frame movable vertically conjointly with and independently of said receiving frame, and pneumatic means for operating said frames to move from an elevated receiving position downward to a setting position and back to receiving position in one complete cycle of operation.

26. A bowling alley pin setter comprising a vertically movable receiving frame, a setting frame movable vertically conjointly with and independently of said receiving frame, pneumatic means manually operated for causing said frames to move downward from receiving to setting position and automatically operated for causing said frames to move upward from setting to receiving position in one complete cycle of operation.

27. A bowling alley pin setter comprising a vertically movable receiving frame, a setting frame movable vertically conjointly with and independently of said receiving frame, and pneumatic means connected with the setting frame for operating said frames.

28. A bowling alley pin setter comprising a vertically movable receiving frame, a setting frame movable vertically conjointly with and independently of said receiving frame, pneumatic means connected with the setting frame for operating said frames, and means on the receiving frame for guiding the setting frame in its independent movement.

29. A bowling alley pin setter comprising a vertically movable setting frame, pneumatic means connected with the setting frame for lowering and raising the same, and a vertically movable receiving frame carried by the setting frame.

30. A bowling alley pin setter comprising a vertically movable setting frame, a vertically movable receiving frame supported by said setting frame, pneumatic means for operating said frames, said setting frame being movable vertically conjointly with and independently of said receiving frame, and means on the receiving frame for guiding the setting frame in its independent movement.

31. A bowling alley pin setter comprising vertically movable receiving and setting frames, pneumatic means for operating said frames, a valve manually operated for lowering said frames and automatically operated for raising said frames.

32. A bowling alley pin setter comprising a frame having pockets therein to receive the pins in inclined position, and ribs on the frame to engage the base of the pins at the top thereof when they are in inclined position.

33. A bowling alley pin setter comprising a receiving frame, a setting frame movable relatively to the receiving frame, and ribs on the setting frame, said frames having pockets in which the pins may lie in inclined position resting upon the receiving frame and with their bases engaged with the ribs on the setting frame.

34. A bowling alley pin setter comprising two relatively movable frames having pockets to receive the pins, one of said frames having a rest upon which the pins lie in inclined position in the pockets, and the other frame having ribs under which the bases of the pins are engaged in inclined position and which ribs operate to impart to the pins an uprighting movement when the frames move relatively.

35. A bowling alley pin setter comprising two relatively movable frames having pockets to receive the pins, said frames being arranged one above the other and the upper frame having means to support the pins in inclined position in the pockets, stops on the lower frame to engage the pins and hold them in said inclined position, and ribs on said stops under which the bases of the pins are engaged and which pull down on the bases of the pins and cause the pins to fulcrum on said means to upright the pins when the frames are moved relatively.

JOSEPH W. BISHOP.